US011743237B2

(12) United States Patent
Fiumara et al.

(10) Patent No.: US 11,743,237 B2
(45) Date of Patent: Aug. 29, 2023

(54) UTILIZING MACHINE LEARNING MODELS TO DETERMINE CUSTOMER CARE ACTIONS FOR TELECOMMUNICATIONS NETWORK PROVIDERS

(71) Applicant: Accenture Global Solutions Limited, Dublin (IE)

(72) Inventors: Thomas Fiumara, Milan (IT); Marta Castrigno, Milan (IT); Luigi Tripputi, Milan (IT); Marco Grigoletti, Milan (IT); Jessica Gobetti, Canegrate (IT)

(73) Assignee: Accenture Global Solutions Limited, Dublin (IE)

( * ) Notice: Subject to any disclaimer, the term of this patent is extended or adjusted under 35 U.S.C. 154(b) by 304 days.

(21) Appl. No.: 17/094,670

(22) Filed: Nov. 10, 2020

(65) Prior Publication Data

US 2022/0150221 A1    May 12, 2022

(51) Int. Cl.
| | |
|---|---|
| *G06N 20/00* | (2019.01) |
| *H04L 9/40* | (2022.01) |
| *G06Q 30/016* | (2023.01) |
| *G06F 18/2415* | (2023.01) |

(52) U.S. Cl.
CPC ...... *H04L 63/0421* (2013.01); *G06F 18/2415* (2023.01); *G06N 20/00* (2019.01); *G06Q 30/016* (2013.01); *H04L 63/20* (2013.01)

(58) Field of Classification Search
CPC ... H04L 63/0421; H04L 63/20; G06Q 30/016; G06K 9/6277
See application file for complete search history.

(56) References Cited

U.S. PATENT DOCUMENTS

| | | | |
|---|---|---|---|
| 2020/0304364 A1* | 9/2020 | Tapia | H04W 24/04 |
| 2021/0027205 A1* | 1/2021 | Sevakula | G06N 3/0445 |
| 2022/0021659 A1* | 1/2022 | Goel | H04L 63/0428 |
| 2022/0022076 A1* | 1/2022 | Saluja | H04B 17/318 |
| 2022/0114593 A1* | 4/2022 | Johnson | G06K 9/6256 |
| 2022/0114594 A1* | 4/2022 | Nunes | H04L 63/102 |
| 2022/0116793 A1* | 4/2022 | Osinski | G06N 20/20 |

FOREIGN PATENT DOCUMENTS

| | | |
|---|---|---|
| KR | 20180130295 A | 12/2018 |
| WO | 2017214271 A1 | 12/2017 |

\* cited by examiner

*Primary Examiner* — Noura Zoubair
*Assistant Examiner* — Thomas A Carnes
(74) *Attorney, Agent, or Firm* — Harrity & Harrity, LLP

(57) ABSTRACT

A device may receive real time telecommunications data associated with a telecommunications network, and may select a first machine learning model from a first plurality of machine learning models based on the real time telecommunications data. The device may select a second machine learning model from a second plurality of machine learning models based on the real time telecommunications data. The device may process, in a first stage, the real time telecommunications data, with the first machine learning model, to determine a probability score indicating whether a customer technical problem telephone call will occur. The device may process, in a second stage and based on the probability score satisfying a threshold, the real time telecommunications data, with the second machine learning model, to determine a category associated with the customer technical problem telephone call, and may perform one or more actions based on the category.

20 Claims, 10 Drawing Sheets

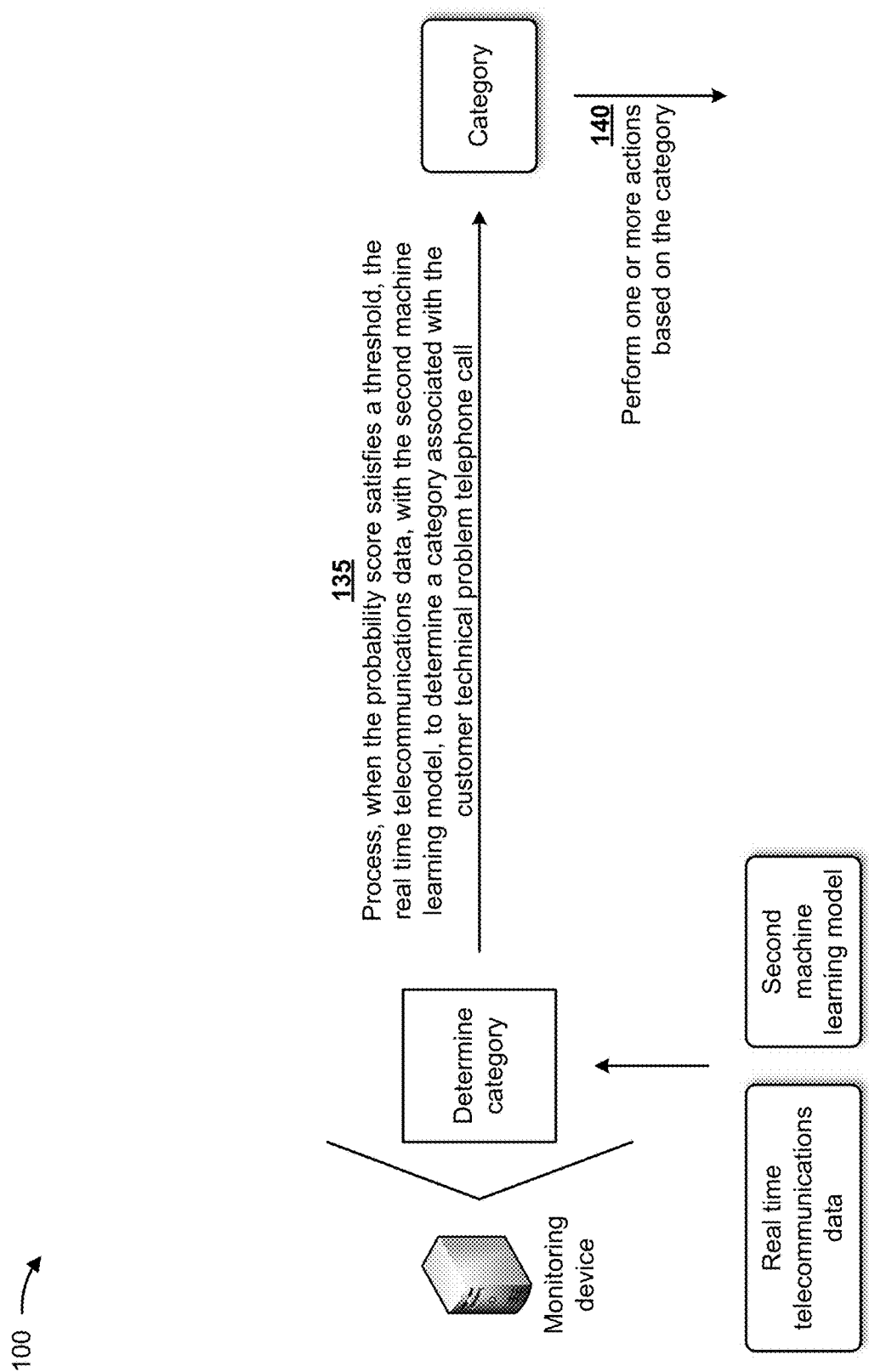

UTILIZING MACHINE LEARNING MODELS TO DETERMINE CUSTOMER CARE ACTIONS FOR TELECOMMUNICATIONS NETWORK PROVIDERS

BACKGROUND

Network, service, and/or customer experience management may include the use of a device and/or system that monitors a computer network for slow or failing components, degradations in services, and/or negative customer experiences, and that provides a notification in case of network outages, service outages, or other network problems. The notification may include the sending of an alarm (e.g., via email, text, or the like) to a network administrator of the network. Network, service, and/or customer experience management may also include monitoring performance indicators associated with performance of the network, service indicators associated with a service, customer experience indicators associated with negative customer experiences, and/or the like, such as response time, availability, uptime, consistency metrics, reliability metrics, and/or the like.

SUMMARY

In some implementations, a method may include receiving real time telecommunications data associated with a telecommunications network, and selecting a first machine learning model from a first plurality of machine learning models based on the real time telecommunications data. The method may include selecting a second machine learning model from a second plurality of machine learning models based on the real time telecommunications data, and processing, in a first stage, the real time telecommunications data, with the first machine learning model, to determine a probability score indicating whether a customer technical problem notification (e.g., a telephone call, a virtual IVR chat, and/or the like) will occur. The method may include in a separate second stage performed subsequent to completion of the first stage, processing, based on the probability score satisfying a threshold, the real time telecommunications data, with the second machine learning model, to determine a category associated with the customer technical problem notification, and performing one or more actions based on the category.

In some implementations, a device includes one or more memories and one or more processors to receive real time telecommunications data associated with a telecommunications network, and anonymize the real time telecommunications data to remove data identifying a telecommunications network provider and customers of the telecommunications network provider, and to generate anonymized real time telecommunications data. The one or more processors may provide the anonymized real time telecommunications data to another device that selects a first machine learning model, from a first plurality of machine learning models, based on the anonymized real time telecommunications data, and that selects a second machine learning model, from a second plurality of machine learning models, based on the anonymized real time telecommunications data. The one or more processors may receive the first machine learning model and the second machine learning model from the other device, and may process, in a first stage, the real time telecommunications data, with the first machine learning model, to determine a probability score indicating whether a customer technical problem telephone call will occur. The one or more processors may, in a separate second stage performed subsequent to completion of the first stage, process, based on the probability score satisfying a threshold, the real time telecommunications data, with the second machine learning model, to determine a category associated with the customer technical problem telephone call, and may perform one or more actions based on the category.

In some implementations, a non-transitory computer-readable medium may store a set of instructions with one or more instructions that, when executed by one or more processors of a device, cause the device to receive real time telecommunications data associated with a telecommunications network, and select a first machine learning model from a first plurality of machine learning models based on the real time telecommunications data. The one or more instructions may cause the device to select a second machine learning model from a second plurality of machine learning models based on the real time telecommunications data, and process, in a first stage, the real time telecommunications data, with the first machine learning model, to determine a probability score indicating whether a customer technical problem telephone call will occur. The one or more instructions may cause the device to determine whether the probability score satisfies a threshold, and, in a separate second stage performed subsequent to completion of the first stage, may selectively process, based on whether the probability score satisfies the threshold, the real time telecommunications data, with the second machine learning model, to determine a category associated with the customer technical problem telephone call. The real time telecommunications data is processed with the second machine learning model, to determine the category, based the probability score satisfying the threshold, and the real time telecommunications data is not processed with the second machine learning model based on the probability score failing to satisfy the threshold. The one or more instructions may cause the device to perform one or more actions based on the category.

BRIEF DESCRIPTION OF THE DRAWINGS

FIGS. 1A-1F are diagrams of an example implementation described herein.

DETAILED DESCRIPTION

Figure 1A:
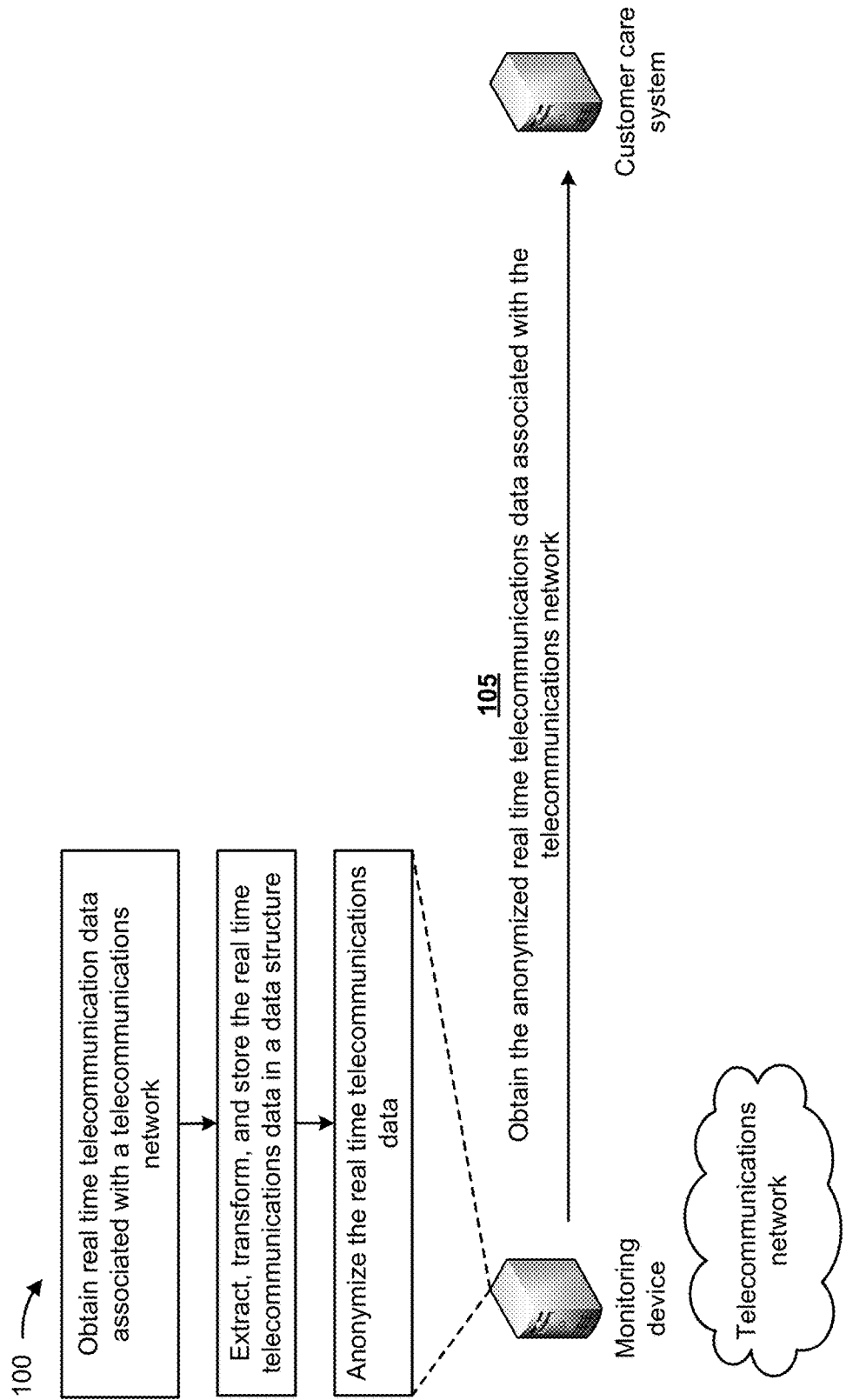

The following detailed description of example implementations refers to the accompanying drawings. The same reference numbers in different drawings may identify the same or similar elements.

In a network operations center, network operations managers may interact with various hardware and software systems to monitor and manage a network. The systems may monitor alarms from the network and/or monitor performance indicators associated with the network. The network operations managers, using the systems, may perform various actions, such as generating trouble tickets, performing recovery actions to process alarms, scheduling network maintenance, and/or the like.

As more and more devices are connected to a network, and more and more services are offered using the network, it becomes less feasible to maintain reliability and availability of the network through manual network monitoring and/or management. For example, as network activity increases, network operations managers may be unable to handle the corresponding increase in the volume of alarms. As a result, alarms may take longer to process, which in turn may result in service outages, increased network downtime, inability to meet service-level requirements (e.g., as required by service-level agreements), and/or the like.

In some cases, prior to an alarm being generated, a customer may generate a notification (e.g., submit a trouble ticket, make a telephone call to a help center, and/or the like) related to a technical issue associated with the telecommunications network, based on an unsatisfactory customer experience. For example, the customer may be experiencing reduced downlink speeds. The reduction in downlink speeds may not be sufficient to cause an alarm to be triggered but may result in the customer having an unsatisfactory customer experience. The hardware and software systems used to monitor and manage the network may be unable to identify the unsatisfactory experience of the customer prior to the customer generating the notification.

Some implementations described herein relate to a monitoring device that determines customer care actions for telecommunications network providers. The monitoring device may include one or more devices for monitoring real time telecommunications data associated with a telecommunications network and may determine the customer care actions based on monitoring the real time telecommunications data. For example, the monitoring device may receive real time telecommunications data associated with the telecommunications network, and may obtain a first machine learning model selected from a first plurality of machine learning models based on the real time telecommunications data. The monitoring device may obtain a second machine learning model selected from a second plurality of machine learning models based on the real time telecommunications data, and may process the real time telecommunications data, with the first machine learning model, to determine a probability score indicating whether a customer will generate a notification associated with a technical problem related to the telecommunications network. The monitoring device may process, based on the probability score satisfying a threshold, the real time telecommunications data, with the second machine learning model, to determine a category associated with the technical problem, and may perform one or more actions to resolve the technical problem based on the category.

In this way, the monitoring device may proactively address issues associated with the telecommunications network and may avoid the triggering of alarms, service outages, network downtime, an inability to meet service-level agreements, and/or the like. This, in turn, may conserve computing resources (e.g., processing resources, memory resources, communication resources, and/or the like), networking resources, and/or the like that would otherwise be wasted in handling unnecessary alarms, handling service outages and network downtime, attempting to meet service-level agreements, and/or the like.

FIGS. 1A-1F are diagrams of an example 100 associated with determining customer care actions for telecommunications network providers. As shown in FIGS. 1A-1F, example 100 includes a customer care system and a monitoring device associated with a telecommunications network. The customer care system may include one or more devices configured to generate and/or train a plurality of machine learning models for determining customer care actions for telecommunications network providers, as described herein.

The monitoring device may be included in the telecommunications network and may monitor the telecommunications network to determine a state of the telecommunications network. For example, the monitoring device may monitor data transmitted via the telecommunications network to identify a slow or failing network component, a degradation in service, a degradation in a customer experience, a network outage, a service outage, and/or another issue associated with the telecommunications network.

As shown in FIG. 1A, the monitoring device may obtain real time telecommunications data associated with the telecommunications network. The monitoring device may obtain the real time telecommunications data in response to transmitting a request to one or more devices included in the telecommunications network, and/or based on an occurrence of an event (e.g., receiving a request from the customer care system, determining that a performance metric associated with the telecommunications network satisfies a threshold, and/or an occurrence of another type of event).

The real time telecommunications data may include data identifying a status of a device associated with the telecommunications network, a performance metric associated with the device, a performance metric associated with the telecommunications network, and/or another type of telecommunications data. For example, the real time telecommunications data may include customer premises equipment (CPE) data associated with the telecommunications network, network device inventory data associated with the telecommunications network, customer call data associated with the telecommunications network, trouble ticket management (TTM) data, optical line terminal (OLT) data, and/or optical network terminal (ONT) data.

In some implementations, the real time telecommunications data comprises data that is transmitted within a customer service provider (CSP) environment and collected by the monitoring device. In some implementations, the monitoring device obtains the real time telecommunications data based on performing a health check on a system included in the telecommunications network. For example, the monitoring device may query a set of network addresses associated with the system and may obtain information regarding whether the set of network addresses direct the monitoring device to an intended portion of the system (e.g., an intended web site, an intended file, etc.). Additionally, or alternatively, the monitoring device may access one or more resources of the system via a set of credentials for the system, and may obtain information regarding the one or more resources of the system. For example, the monitoring device may perform a set of test logins using a set of usernames and a set of passwords to determine whether the system is properly granting access to files of the system, services of the system, and/or applications of the system.

Additionally, or alternatively, the monitoring device may determine a set of metrics associated with the system, such as an amount of time required to receive a response to a login attempt and/or an amount of available disk space associated with the set of data structures. For example, the monitoring device may determine whether a threshold amount of disk space is available to the system. In this case, the monitoring device may analyze multiple data structures associated with the system and determine whether the system maintains a threshold amount of available disk space. As another example, the monitoring device may connect to a database (e.g., an enterprise database, such as a structured query language (SQL) database, an Oracle database, or the like) of a particular data structure, and may obtain one or more metrics associated with the database, such as a query count and/or a latency associated with performing a query.

Additionally, or alternatively, the monitoring device may parse stored information associated with the system. For example, the monitoring device may obtain a set of log files associated with the system, and may parse the set of log files to determine information regarding a status of the system. In some implementations, the monitoring device may identify one or more issues associated with the system based on parsing the set of log files. For example, the monitoring device may parse the set of log files to identify a set of keywords included in the set of log files that correspond to an issue with the system, such as identifying the word "error" and/or "warning" included in the set of log files. In this case, the monitoring device may obtain information associated with identifying the set of keywords, such as a set of error identifiers included in the set of log files.

Additionally, or alternatively, the monitoring device may identify a set of blocking queries directed to the system, based on information included in the set of log files. For example, the monitoring device may utilize stored information to classify queries identified in the set of log files as blocking queries (e.g., a query that is active for a database and prevents other queries or modifications from being performed on the database). Additionally, or alternatively, the monitoring device may parse the set of log files to determine if a background task is operating (e.g., a Java task, a .Net task, or the like). Similarly, the monitoring device may determine whether one or more operating system specific services are operating on the system.

In some implementations, the real time telecommunications data includes information identifying a response action performed by the monitoring device and/or information identifying a result associated with performing the response action. For example, the monitoring device may perform a set of response actions based on a result of the set of health checks. For example, the real time telecommunications data may include information indicating that the monitoring device identified a set of blocking queries, performed an action to terminate a set of blocking queries based on identifying the set of blocking queries, and/or whether the action was successful in terminating the set of blocking queries.

As another example, the real time telecommunications data may include information indicating that the monitoring device identified a known error based on an error identifier included in a log file, obtained instructions for correcting the known error, performed an action to correct the known error (e.g., based on the instructions), and/or whether the known error was corrected based on performing the action. As another example, the real time telecommunications data may include information indicating that the monitoring device performed an action to cause resources of the system to be automatically reallocated based on metrics associated with the system (e.g., reallocating a set of memory resources from a first server to a second server and/or reallocating a set of processing resources from a first subsystem to a second subsystem) and information identifying a result of reallocating the resources (e.g., information identifying a performance metric of the system after the resources are reallocated).

As further shown in FIG. 1A, in some implementations, the monitoring device extracts, transforms, and stores the real time telecommunications data in a data structure (e.g., a database, a table, a list, and/or the like) associated with the monitoring device. In some implementations, the monitoring device processes the telecommunications data based on obtaining the telecommunications data. For example, the monitoring device may convert the telecommunications data to a common format, encrypt the telecommunications data, compress the telecommunications data, and/or anonymize the telecommunications data to remove information associated with a customer, the CSP, and/or the telecommunications network.

In some implementations, the monitoring device processes the telecommunications data based on a natural language processing (NLP) technique. As an example, the telecommunications data may include a notification (e.g., a trouble ticket) generated for a customer of the telecommunications network. The monitoring device may utilize an NLP technique to convert text included in the notification to lowercase text, remove punctuation, remove stop words, strip white space, perform stemming, perform lemmatization, and/or spell out abbreviations and acronyms. The monitoring device may store the processed telecommunications data as real time telecommunications data in the data structure.

As further shown in FIG. 1A, the monitoring device may anonymize the real time telecommunications data. The monitoring device may anonymize the real time telecommunications data to remove data identifying a telecommunications network provider associated with the telecommunications network, data identifying customers of the telecommunications network provider, data identifying components of the telecommunications network, and/or other types of sensitive information.

As further shown in FIG. 1A, and by reference number 105, the customer care system may obtain the anonymized real time telecommunications data associated with the telecommunications network from the monitoring device. In some implementations, the customer care system periodically (e.g., daily, weekly, monthly, and/or the like) receives the anonymized real time telecommunications data. For example, the customer care system may periodically receive the anonymized real time telecommunications data via a batch upload. Alternatively, and/or additionally, the customer care system may receive the anonymized real time telecommunications data based on transmitting a request to the monitoring device.

In some implementations, the anonymized real time telecommunications data is included in a comma separated value (CSV) file. The monitoring device may write the stored real time telecommunications data to the CSV file. The monitoring device may anonymize the CSV file to remove sensitive information, such as information identifying a customer and/or information identifying the CSP. The monitoring device may encrypt and/or compress the anonymized CSV file and may transmit the encrypted and/or compressed CSV file to the customer care system.

The customer care system may process the anonymized real time telecommunications data based on receiving the anonymized real time telecommunications data from the monitoring device. For example, the customer care system may further anonymize the anonymized real time telecommunications data, may decompress the anonymized real time telecommunications data, may decrypt the anonymized real time telecommunications data, and/or may convert the CSV file to a format utilized by the customer care system (e.g., a format compatible with training a plurality of machine learning models, as described below).

Figure 1B:
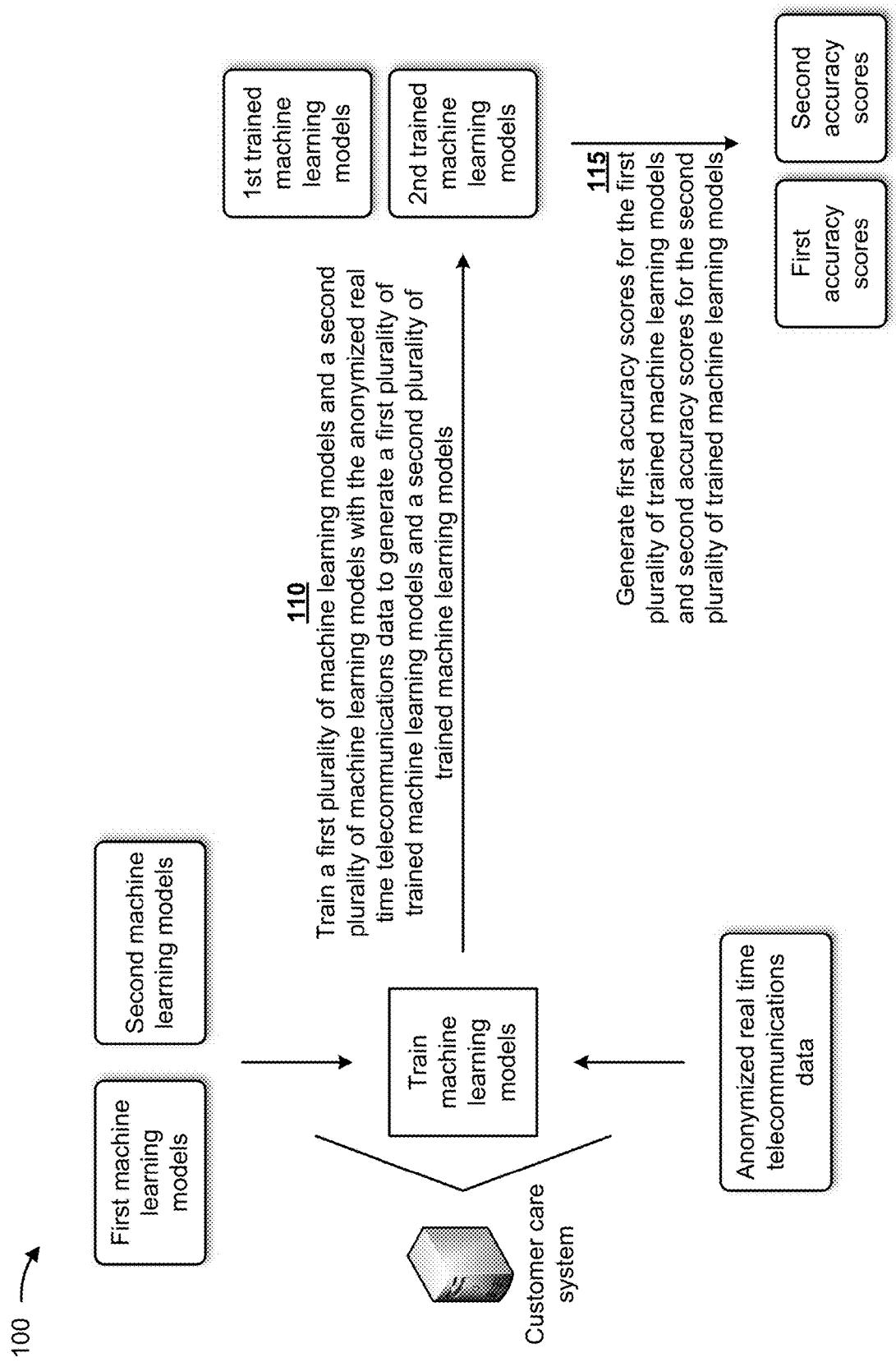

As shown in FIG. 1B, and by reference number 110, the customer care system may train a first plurality of machine learning models and a second plurality of machine learning models, with the anonymized real time telecommunications data, to generate a first plurality of trained machine learning models and a second plurality of trained machine learning models. The first plurality of machine learning models and the second plurality of machine learning models each may include a random forest model, a linear regression model, a neural network model, a convolutional neural network (CNN) model, a deep neural network (DNN) model, a Siamese network model, and/or another type of machine learning model.

The customer care system may train the first plurality of machine learning models to generate an output indicating a probability score indicating whether a customer technical problem notification (e.g., a telephone call) will occur, and a first confidence score associated with the probability score. For example, the probability score may reflect a likelihood that a customer will generate a notification indicating an issue associated with the telecommunications network. The first confidence score may reflect a measure of confidence that the probability score is accurate for the customer. The customer care system may train the second plurality of machine learning models to generate an output indicating a category associated with the customer technical problem notification (e.g., telephone call), and a second confidence score associated with the category. The second confidence score may reflect a measure of confidence that the category is accurate for the customer technical problem notification. In some implementations, the customer care system trains the first plurality of machine learning models and the second plurality of machine learning models in a manner similar to that described below with respect to FIG. 2. In some implementations, the customer care system trains the first plurality of machine learning models and the second plurality of machine learning models at the same time (e.g., in parallel).

As further shown in FIG. 1B, and by reference number 115, the customer care system may generate first accuracy scores for the first plurality of trained machine learning models and second accuracy scores for the second plurality of trained machine learning models. The customer care system may generate the first accuracy scores for the first plurality of trained machine learning models based on the first confidence scores determined by the first plurality of trained machine learning models. In some implementations, the customer care system may determine the first accuracy score for a machine learning model, of the first plurality of trained machine learning models, based on a highest confidence score determined by the machine learning model, a last confidence score determined by the machine learning model, an average confidence score determined by the machine learning model, a median confidence score determined by the machine learning model, and/or the like.

The customer care system may generate the second accuracy scores for the second plurality of trained machine learning models based on the second confidence scores determined by the second plurality of trained machine learning models. In some implementations, the customer care system may determine the second accuracy score for a machine learning model, of the second plurality of trained machine learning models, based on a highest confidence score determined by the machine learning model, a last confidence score determined by the machine learning model, an average confidence score determined by the machine learning model, a median confidence score determined by the machine learning model, and/or the like.

Figure 1C:
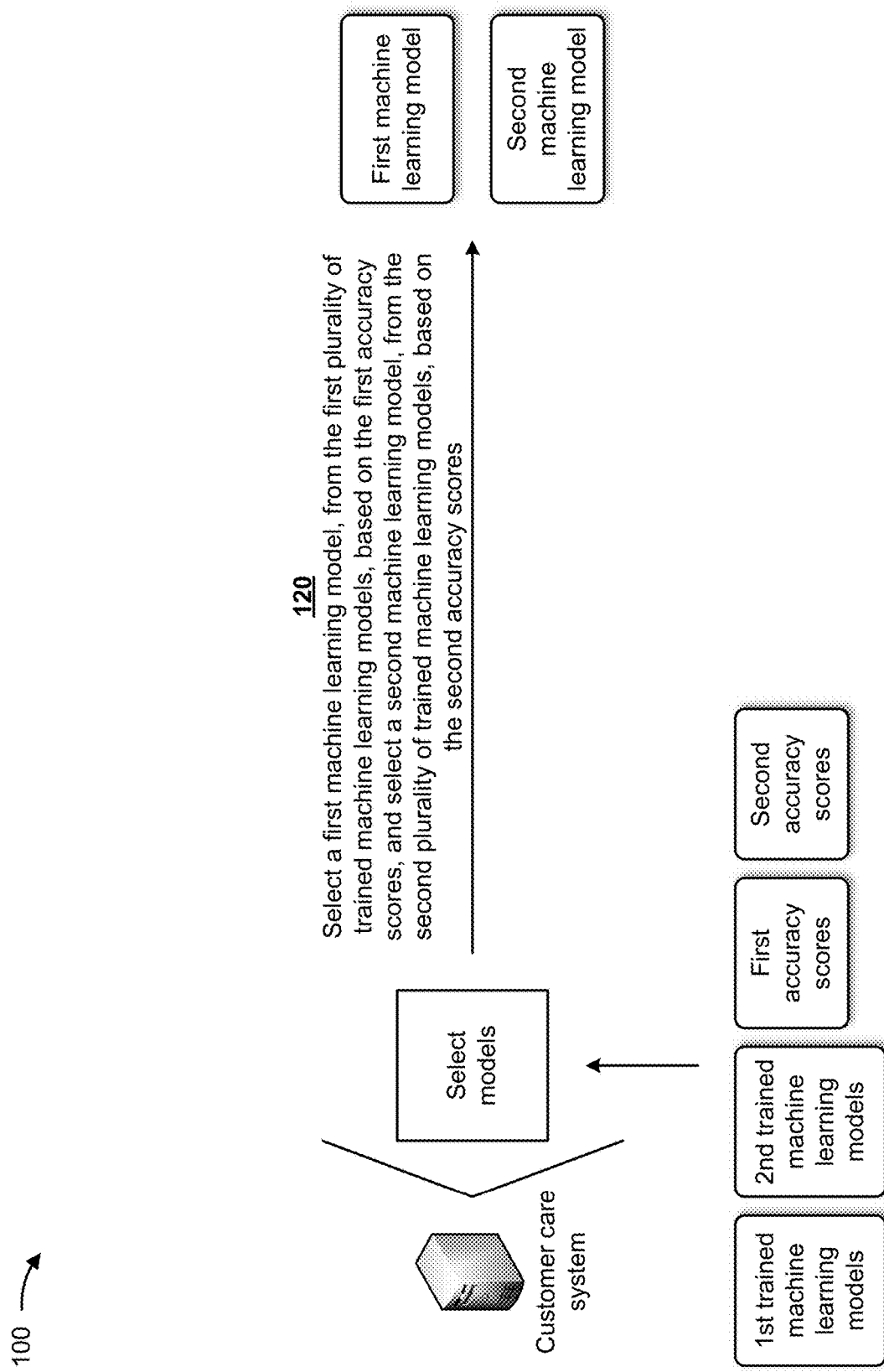

As shown in FIG. 1C, and by reference number 120, the customer care system may select a first machine learning model, from the first plurality of trained machine learning models, based on the first accuracy scores, and may select a second machine learning model, from the second plurality of trained machine learning models, based on the second accuracy scores. The customer care system may identify, as the first machine learning model, one of the first plurality of trained machine learning models associated with the highest first accuracy score relative to the first accuracy scores associated with the other first trained machine learning models. The customer care system may select the identified machine learning model as the first machine learning model based on the identified machine learning model being associated with the highest first accuracy score.

The customer care system may identify, as the second machine learning model, one of the second plurality of trained machine learning models associated with the highest second accuracy score relative to the second accuracy scores associated with the other second trained machine learning models. The customer care system may select the identified machine learning model as the second machine learning model based on the identified machine learning model being associated with the highest second accuracy score.

Figure 1D:
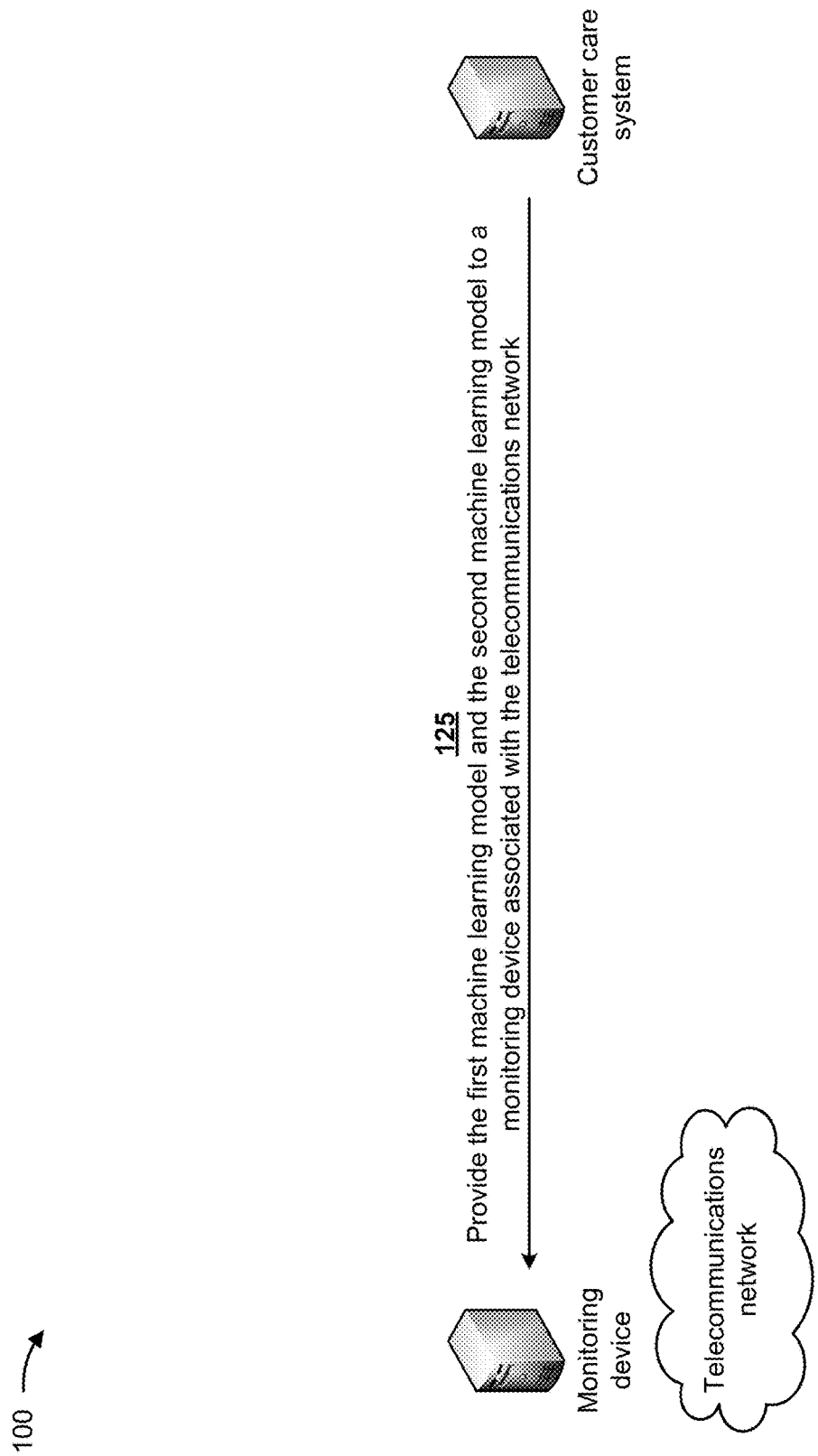

As shown in FIG. 1D, and by reference number 125, the customer care system may provide the first machine learning model and the second machine learning model to the monitoring device associated with the telecommunications network. In some implementations, the customer care system provides the first machine learning model and the second machine learning model to the monitoring device based on selecting the first machine learning model from the first plurality of trained machine learning models and based on selecting the second machine learning model from the second plurality of trained machine learning models. In some implementations, the customer care system provides the first machine learning model and the second machine learning model to the monitoring device based on the monitoring device receiving telecommunications data associated with the telecommunications network. For example, the monitoring device may receive real time telecommunications data associated with the telecommunications network, and may request the first machine learning model and the second machine learning model from the customer care system based on receiving the real time telecommunications data.

Figure 1E:
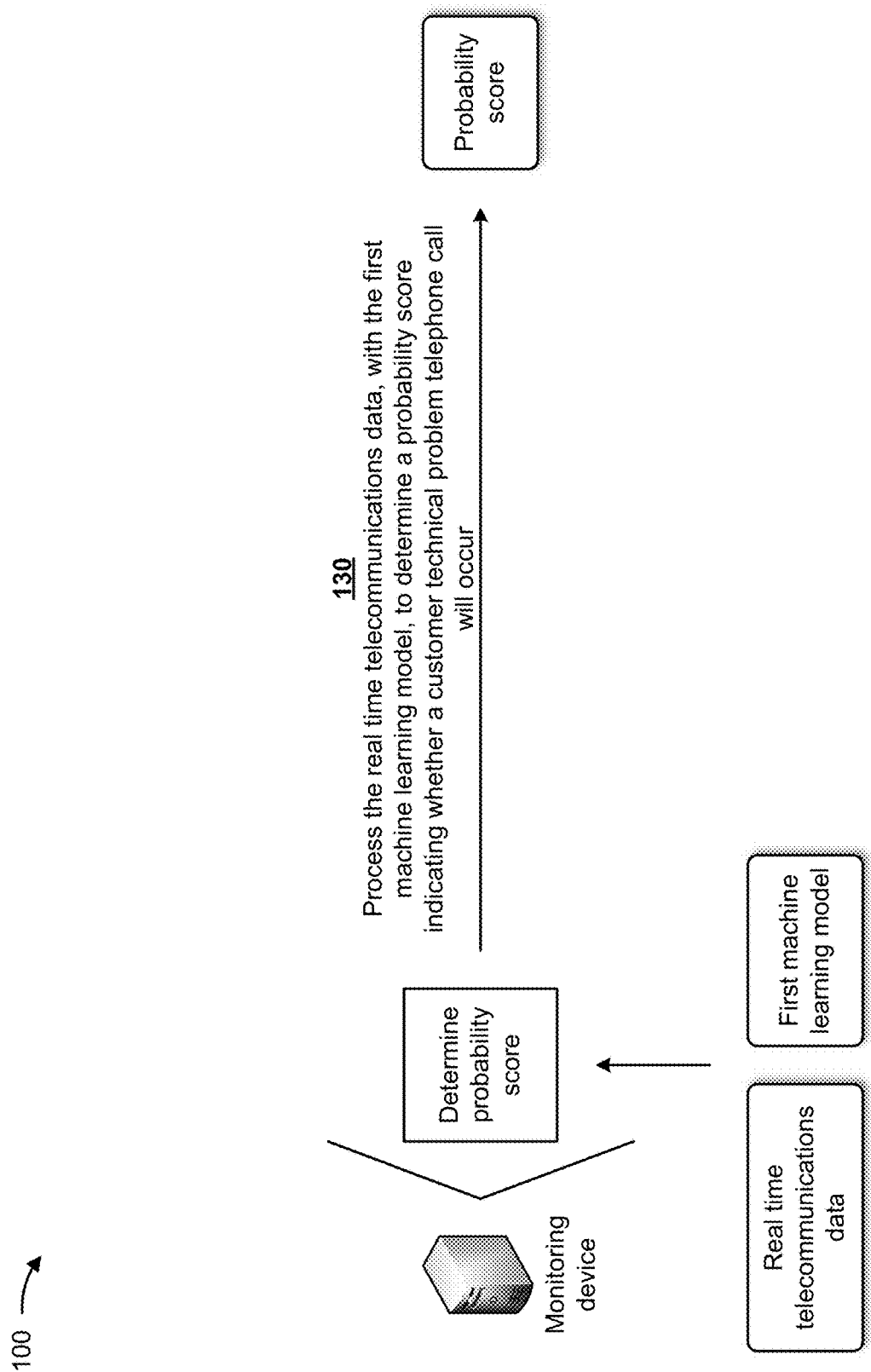

As shown in FIG. 1E, and by reference number 130, the monitoring device may process the real time telecommunications data, with the first machine learning model, to determine a probability score indicating whether a customer technical problem notification (e.g., a telephone call) will occur. In some implementations, the monitoring device may first determine the probability score, based on processing the real time telecommunications data with the first machine learning model, before processing the real time telecommunications data with the second machine learning model. In such implementations, the monitoring device may process the real time telecommunications data with the second machine learning model (e.g., to identify a category associated with the technical problem, as described below) when the probability score satisfies a score threshold. In this way, the monitoring device may not process the real time telecommunications data with the second machine learning when the probability score fails to satisfy the score threshold, which may conserve computing resources, networking resources, and/or the like that would otherwise be wasted processing the real time telecommunications data with the second machine learning model for issues unlikely to result in a customer technical problem notification.

In some implementations, the monitoring device may consider all technical problem notifications as equal, while reducing human error associated with predicting a category for a specific issue only when the probability score satisfies the score threshold (e.g., indicating that the customer is actually affected by a technical issue). In this way, the monitoring device may reduce a quantity of false positives associated with technical issues, which may conserve computing resources, networking resources, and/or the like that would otherwise be wasted processing the real time telecommunications data with the second machine learning model. The monitoring device may process real time telecommunications with the first machine learning model to determine the probability score, and may determine whether the probability score satisfies the score threshold in order to predict whether the customer will be calling for a technical issue (e.g., independent from a category of the technical issue).

As shown in FIG. 1F, and by reference number 135, the monitoring device may process, when the probability score satisfies the score threshold, the real time telecommunications data, with the second machine learning model, to determine a category associated with the customer technical problem notification (e.g., telephone call). When the probability score fails to satisfy the score threshold, the monitoring device may not process the real time telecommunications data with the second machine learning model, which may conserve computing resources, networking resources, and/or the like that would otherwise be wasted processing the real time telecommunications data with the second machine learning model for issues unlikely to result in a customer technical problem notification.

The category associated with the customer technical problem may include a category associated with line instability, line slowness, Wi-Fi issues, CPE health issues, and/or the like. The line instability category may indicate that the customer is at a higher risk of intermittent connection with the telecommunications network (e.g., a network connectivity issue, a network bandwidth issue, a network signal strength issue, and/or the like). For example, line instability may occur when Internet connectivity is unstable. The Internet connectivity may operate correctly when stable, but the Internet connectivity may be stable for only short periods of time. The line slowness category may indicate that the customer is at a higher risk of a slow connection with the telecommunications network (e.g., due to a network connectivity issue, a network bandwidth issue, a network signal strength issue, and/or the like). For example, line slowness may occur when an actual speed (e.g., a bandwidth) of Internet connectivity is less than a speed for which the customer paid (e.g., when the Internet connectivity speed is less than a particular percentage of a contract level speed). The Wi-Fi issues category may indicate that the customer is experiencing an issue associated with interference, an intermittent Wi-Fi connection, Wi-Fi configurations, and/or the like. The CPE health issues category may indicate that the customer is experiencing a customer premises equipment issue.

As further shown in FIG. 1F, and by reference number 140, the monitoring device may perform one or more actions based on the category. The one or more actions may include the monitoring device providing a notification, associated with the category, to one or more customer devices. For example, the monitoring device may provide, to a customer device of a customer, a notification indicating that line slowness, line instability, Wi-Fi issues, CPE health issues, and/or the like are occurring for the customer. The notification may also provide an estimate of a time period associated with the issues. In this way, the customer may not contact the telecommunications network provider, which may conserve resources (e.g., computing resources, networking resources, and/or the like) associated with handling the customer contact.

The one or more actions may include the monitoring device dispatching a technician to address a technical problem associated with the category. For example, a technician may be dispatched to service a damaged network device, a damaged optical cable, and/or the like that is causing the technical problem. The monitoring device may provide, to the customer device of the customer, a notification indicating that the technician has been dispatched to correct the technical problem. In this way, the customer may not contact the telecommunications network provider, which may conserve resources associated with handling the customer contact.

The one or more actions may include the monitoring device dispatching an autonomous vehicle to address the technical problem associated with the category. For example, an autonomous vehicle may be dispatched to service a damaged network device, a damaged optical cable, and/or the like that is causing the technical problem. The monitoring device may provide, to the customer device of the customer, a notification indicating that the autonomous vehicle has been dispatched to correct the technical problem. In this way, the customer may not contact the telecommunications network provider, which may conserve resources associated with handling the customer contact.

The one or more actions may include the monitoring device causing a new network device to be added to the telecommunications network based on the category. For example, the telecommunications network may include a backup network device that may be instantiated when a network device of the telecommunications network becomes inoperable. The backup network device may perform the functions of the inoperable network device. In this way, the monitoring device may address the category before customers begin calling the telecommunications provider about the category.

The one or more actions may include the monitoring device changing a configuration of the telecommunications network based on the category. For example, the monitoring device may change a configuration (e.g., channel switching, bandwidth switching, and/or the like) to address a Wi-Fi interference issue occurring for the customer. The monitoring device may provide, to the customer device of the customer, a notification indicating that the configuration change should address the technical problem. In this way, the customer may not contact the telecommunications network provider, which may conserve resources associated with handling the customer contact.

The one or more actions may include the monitoring device causing a software upgrade to be implemented in the telecommunications network based on the category. For example, the CPE of the customer may include outdated firmware, and the monitoring device may provide a firmware upgrade to the CPE of the customer. In this way, the monitoring device may address the CPE issue before customers begin calling the telecommunications provider about the CPE issue.

In this way, the monitoring device may proactively address issues associated with the telecommunications network and may thereby reduce an average amount of time for resolving customer issues and may avoid the triggering of alarms, service outages, network downtime, an inability to meet service-level agreements, and/or the like. This, in turn, may conserve computing resources (e.g., processing resources, memory resources, communication resources, and/or the like), networking resources, and/or the like that would otherwise be wasted in handling unnecessary alarms, handling service outages and network downtime, attempting to meet service-level agreements, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
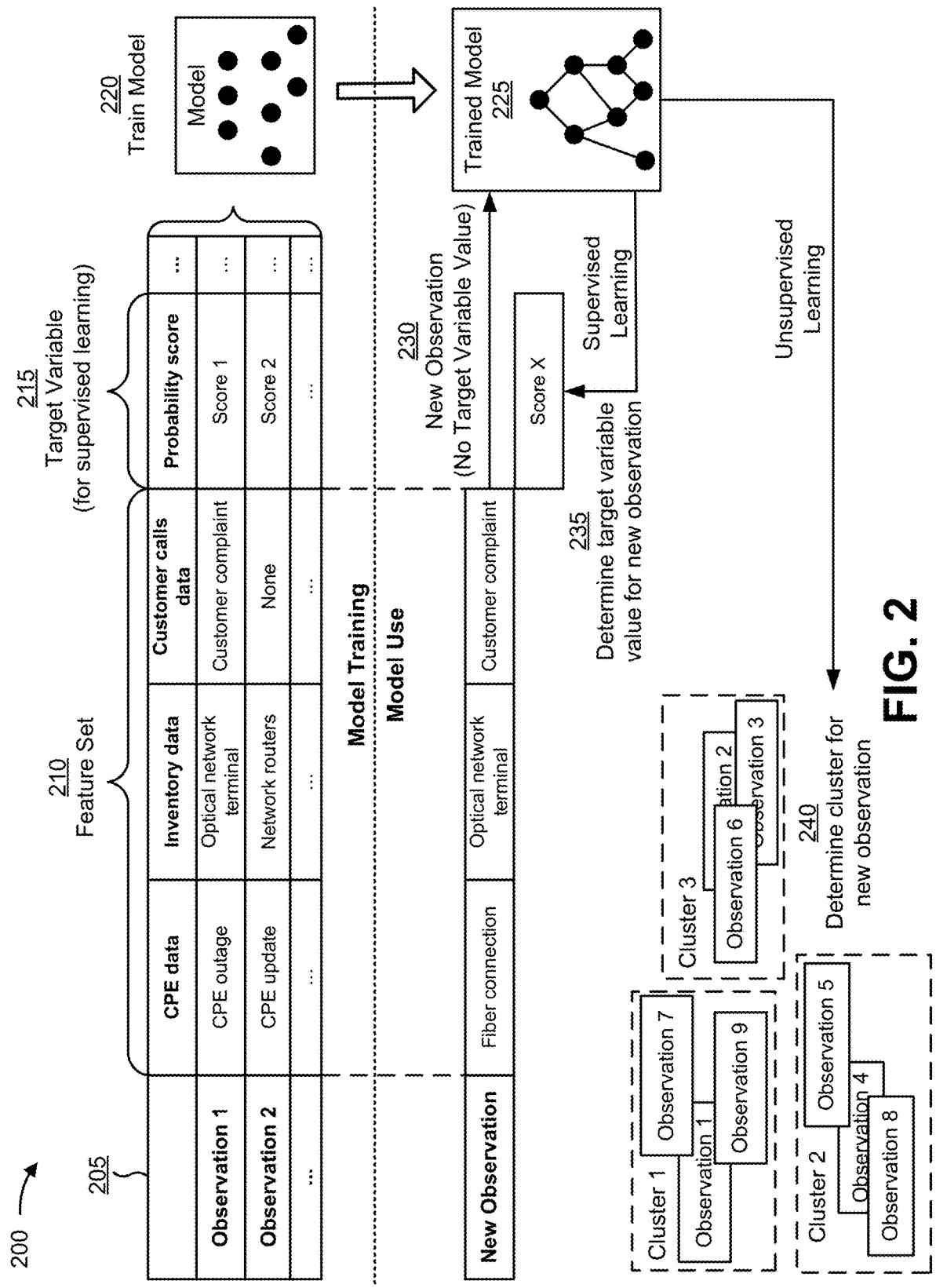
FIG. 2 is a diagram illustrating an example of training and using a machine learning model in connection with determining customer care actions for telecommunications network providers.

FIG. 2 is a diagram illustrating an example 200 of training and using a machine learning model in connection with determining a probability score indicating whether a customer technical problem notification (e.g., telephone call) will occur and determining a category associated with the customer technical problem telephone call. The machine learning model training and usage described herein may be performed using a machine learning system. The machine learning system may include or may be included in a computing device, a server, a cloud computing environment, and/or the like, such as the monitoring device and/or the customer care system, described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the monitoring device and/or the customer care system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the monitoring device and/or the customer care system. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of CPE data, a second feature of inventory data, a third feature of customer calls data, and so on. As shown, for a first observation, the first feature may have a value of a CPE outage, the second feature may have a value of an optical network terminal, the third feature may have a value of a customer complaint, and so on. These features and feature values are provided as examples, and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable is a probability score, which has a value of Score 1 for the first observation. The feature set and target variable described above are provided as examples, and other examples may differ from what is described above.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of CPE data, a second feature of inventory data, a third feature of customer calls data, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of Score X for the target variable of probability score for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a high probability cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to determine a probability score indicating whether a customer technical problem telephone call will occur and determine a category associated with the customer technical problem telephone call. The machine learning system enables recognition and/or identification of tens, hundreds, thousands, or millions of features and/or feature values for tens, hundreds, thousands, or millions of observations, thereby increasing accuracy and consistency and reducing delay associated with determining a probability score indicating whether a customer technical problem telephone call will occur and determining a category associated with the customer technical problem telephone call relative to requiring computing resources to be allocated for tens, hundreds, or thousands of operators to manually determine a probability score indicating whether a customer technical problem telephone call will occur and determine a category associated with the customer technical problem telephone call using the features or feature values.

As indicated above, FIG. 2 is provided as an example. Other examples may differ from what is described in connection with FIG. 2.

Figure 3:
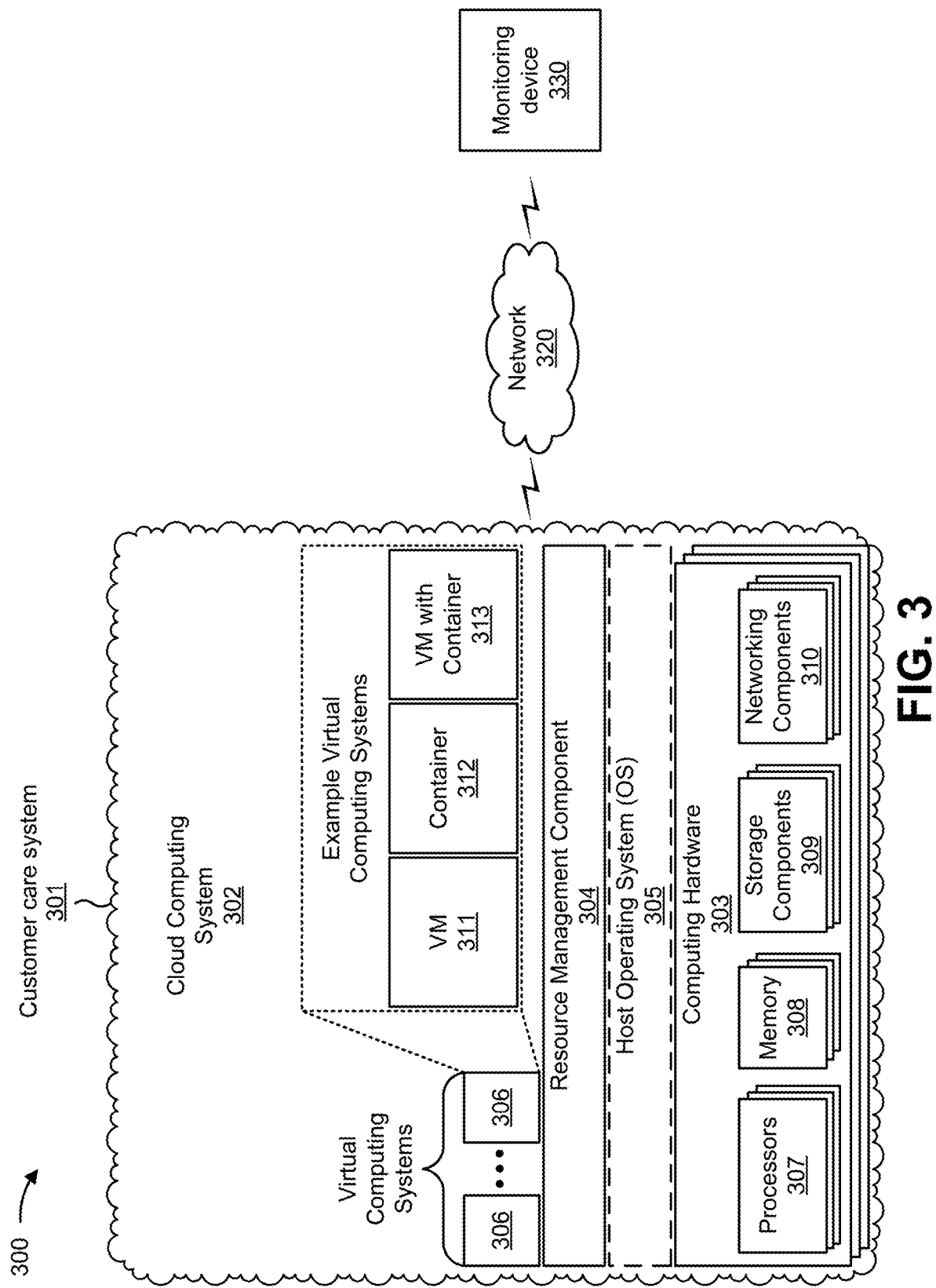
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a customer care system 301, which may include one or more elements of and/or may execute within a cloud computing system 302. The cloud computing system 302 may include one or more elements 303-313, as described in more detail below. As further shown in FIG. 3, environment 300 may include a network 320 and/or a monitoring device 330. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the customer care system 301 may include one or more elements 303-313 of the cloud computing system 302, may execute within the cloud computing system 302, and/or may be hosted within the cloud computing system 302, in some implementations, the customer care system 301 may not be cloud-based (e.g., may be implemented outside of a cloud computing system) or may be partially cloud-based. For example, the customer care system 301 may include one or more devices that are not part of the cloud computing system 302, such as device 400 of FIG. 4, which may include a standalone server or another type of computing device. The customer care system 301 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or the like, and/or a combination of these or other types of networks. The network 320 enables communication among the devices of environment 300.

Monitoring device 330 includes one or more devices capable of receiving, generating, storing, processing, providing, and/or routing information associated with determining customer care actions for telecommunications network providers, as described elsewhere herein. The monitoring device 330 may include a communication device and/or a computing device. For example, the monitoring device 330 may include a server, an application server, a client server, a web server, a database server, a host server, a proxy server, a virtual server (e.g., executing on computing hardware), a server in a cloud computing system, a device that includes computing hardware used in a cloud computing environment, or a similar type of device. The monitoring device 330 may communicate with one or more other devices of environment 300, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
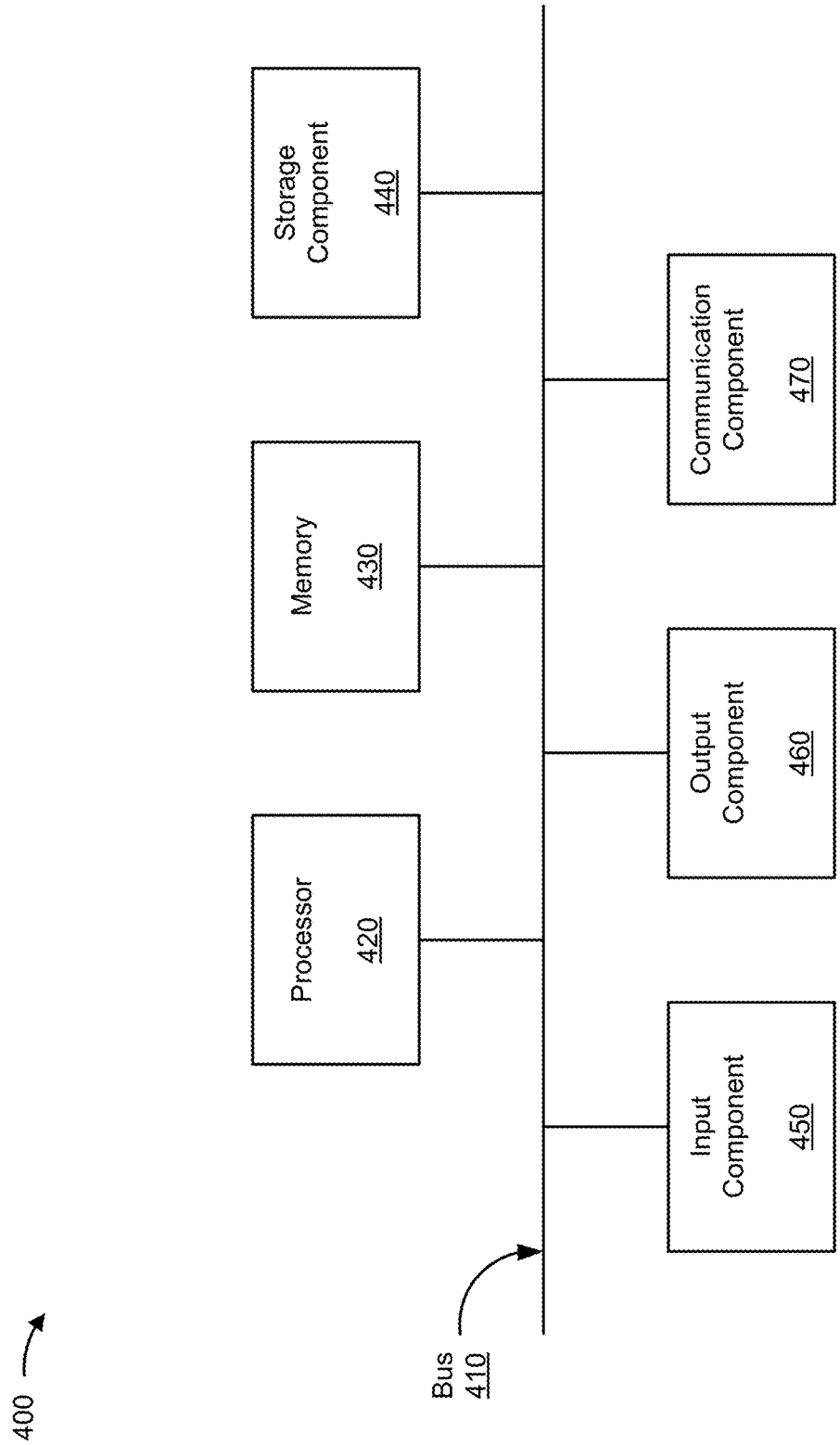
FIG. 4 is a diagram of example components of one or more devices of FIG. 3.

FIG. 4 is a diagram of example components of a device 400, which may correspond to customer care system 301 and/or monitoring device 330. In some implementations, customer care system 301 and/or monitoring device 330 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
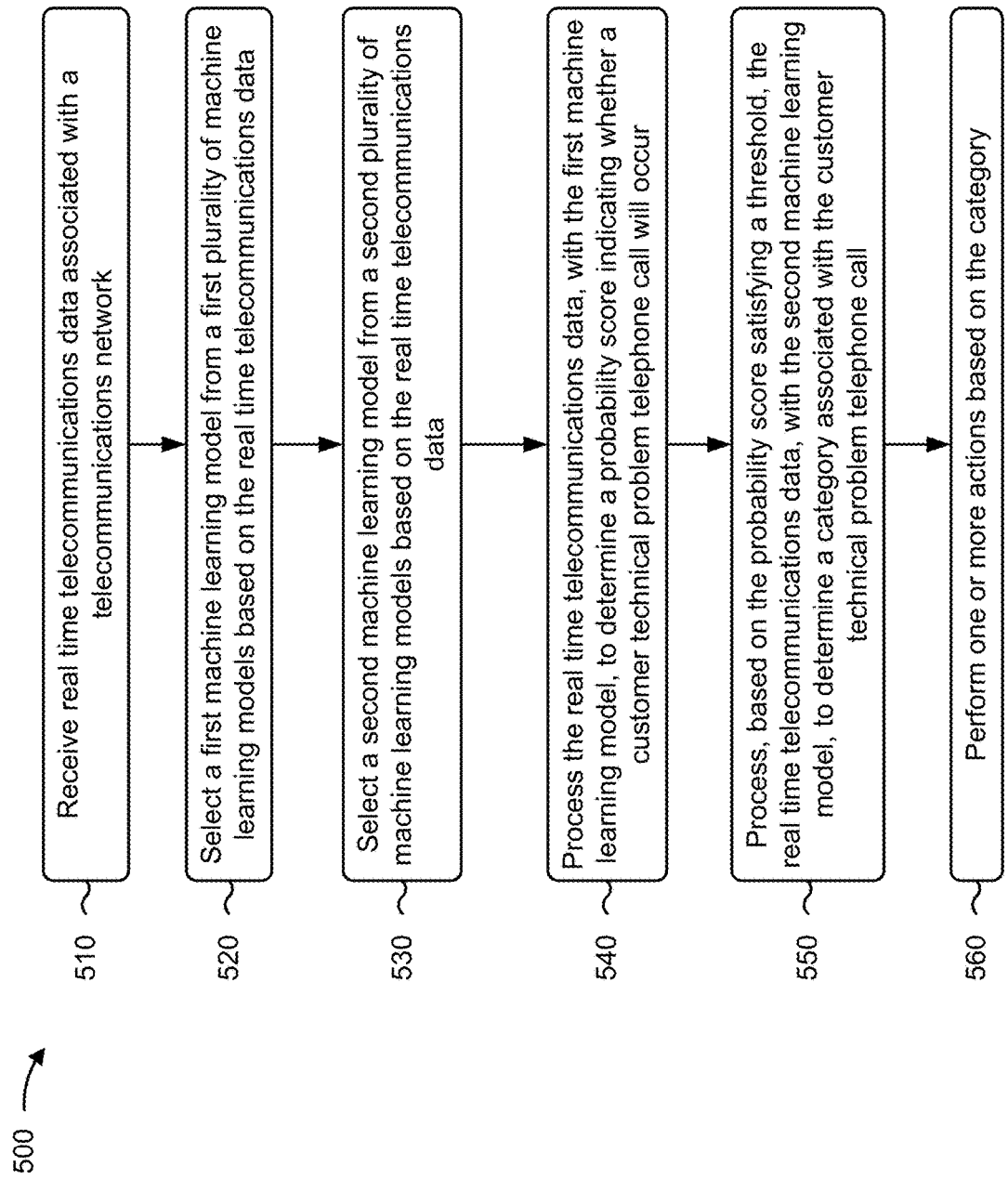
FIG. 5 is a flowchart of an example process relating to determining customer care actions for telecommunications network providers.

FIG. 5 is a flowchart of an example process 500 associated with utilizing machine learning models to determine customer care actions for telecommunications network providers. In some implementations, one or more process blocks of FIG. 5 may be performed by a device (e.g., monitoring device 330). In some implementations, one or more process blocks of FIG. 5 may be performed by another device or a group of devices separate from or including the device, such as a customer care system (e.g., customer care system 301). Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving real time telecommunications data associated with a telecommunications network (block 510). For example, the device may receive real time telecommunications data associated with a telecommunications network, as described above. The real time telecommunications data may include one or more of: real time CPE data associated with the telecommunications network, real time network device inventory data associated with the telecommunications network, real time customer calls data associated with the telecommunications network, real time access layer data associated with an access layer of the telecommunications network, real time call center log data associated with the telecommunications network, or real time backend data associated with the telecommunications network.

As further shown in FIG. 5, process 500 may include selecting a first machine learning model from a first plurality of machine learning models based on the real time telecommunications data (block 520). For example, the device may select a first machine learning model from a first plurality of machine learning models based on the real time telecommunications data, as described above. The first plurality of machine learning models may include one or more random forest models, one or more linear regression models, or one or more neural network models.

As further shown in FIG. 5, process 500 may include selecting a second machine learning model from a second plurality of machine learning models based on the real time telecommunications data (block 530). For example, the device may select a second machine learning model from a second plurality of machine learning models based on the real time telecommunications data, as described above. The second plurality of machine learning models may include one or more random forest models, one or more linear regression models, or one or more neural network models.

In some implementations, process 500 may include receiving the first machine learning model and/or the second machine learning model from another device. For example, process 500 may include anonymizing the real time telecommunications data to remove data identifying a telecommunications network provider and customers of the telecommunications network provider, and providing the anonymized real time telecommunications data to another device that selects the first machine learning model and/or the second machine learning model. The other device may provide the first machine learning model and/or the second machine learning model to the device.

In some implementations, process 500 may include training the first plurality of machine learning models with historical telecommunications data to generate a first plurality of trained machine learning models, and providing the first plurality of trained machine learning models to the other device. The other device may select the first machine learning model from the first plurality of trained machine learning models.

Alternatively, and/or additionally, process 500 may include training the second plurality of machine learning models with historical telecommunications data to generate a second plurality of trained machine learning models, and providing the second plurality of trained machine learning models to the other device. The other device may select the second machine learning model from the second plurality of trained machine learning models.

As further shown in FIG. 5, process 500 may include processing the real time telecommunications data, with the first machine learning model, to determine a probability score indicating whether a customer technical problem telephone call will occur (block 540). For example, in a first stage, the device may process the real time telecommunications data, with the first machine learning model, to determine a probability score indicating whether a customer technical problem telephone call will occur, as described above. In some implementations, processing the real time telecommunications data, with the first machine learning model, to determine the probability score includes determining a propensity score indicating a propensity of a customer to complain; determining a likelihood score indicating a likelihood that the customer is affected by a technical problem; and determining the probability score based on the propensity score and the likelihood score.

As further shown in FIG. 5, process 500 may include processing, based on the probability score satisfying a threshold, the real time telecommunications data, with the second machine learning model, to determine a category associated with the customer technical problem telephone call (block 550). For example, in a separate second stage performed subsequent to completion of the first stage, the device may process, based on the probability score satisfying a threshold, the real time telecommunications data, with the second machine learning model, to determine a category associated with the customer technical problem telephone call, as described above. The probability score satisfying the threshold may reduce a determination of an incorrect category by the second machine learning model. The category may be associated with one or more of a network connectivity issue, a network bandwidth issue, a network signal strength issue, or a CPE issue.

In some implementations, the probability score may fail to satisfy the threshold. In these implementations, the device may prevent the processing of the real time telecommunications data with the second machine learning model based on the probability score failing to satisfy the threshold.

As further shown in FIG. 5, process 500 may include performing one or more actions based on the category (block 560). For example, the device may perform one or more actions based on the category, as described above. The one or more actions may include providing a notification, associated with the category, to one or more customer devices, dispatching a technician to address a technical problem associated with the category, or dispatching an autonomous vehicle to address the technical problem associated with the category. Alternatively, and/or additionally, the one or more actions may include causing a new network device to be added to the telecommunications network based on the category, changing a configuration of the telecommunications network based on the category, or causing a software upgrade to be implemented in the telecommunications network based on the category.

In some implementations, performing the one or more actions may include providing a notification, associated with the category, to one or more customer devices; dispatching a technician to address a technical problem associated with the category; dispatching an autonomous vehicle to address the technical problem associated with the category; causing a new network device to be added to the telecommunications network based on the category; changing a configuration of the telecommunications network based on the category; or causing a software upgrade to be implemented in the telecommunications network based on the category.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, etc., depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device, real time telecommunications data associated with a telecommunications network;
   anonymizing the real time telecommunications data to remove data identifying a telecommunications network provider and customers of the telecommunications network provider, and to generate anonymized real time telecommunications data;
   determining, by the device, first accuracy scores for a first plurality of machine learning models and second accuracy scores for a second plurality of machine learning models;
   selecting, by the device, a first machine learning model from the first plurality of machine learning models based on the anonymized real time telecommunications data and the first accuracy scores;
   selecting, by the device, a second machine learning model from the second plurality of machine learning models based on the anonymized real time telecommunications data and the second accuracy scores;
   in a first stage, processing, by the device, the real time telecommunications data, with the first machine learning model, to determine a probability score indicating whether a customer technical problem telephone call will occur,
   wherein processing the real time telecommunications data, with the first machine learning model, to determine the probability score comprises:
      determining a propensity score indicating a propensity of a customer to complain,
      determining a likelihood score indicating a likelihood that the customer is affected by a technical problem, and
      determining the probability score based on the propensity score and the likelihood score;
   in a separate second stage performed subsequent to completion of the first stage, processing, by the device and based on the probability score satisfying a threshold, the real time telecommunications data, with the second machine learning model, to determine a category associated with the customer technical problem telephone call; and
   performing, by the device, one or more recovery actions based on the category.

2. The method of claim 1, wherein the real time telecommunications data includes one or more of:
   real time customer premise equipment data associated with the telecommunications network,
   real time network device inventory data associated with the telecommunications network, or
   real time customer calls data associated with the telecommunications network.

3. The method of claim 1, further comprising:
   providing the anonymized real time telecommunications data to another device that selects the first machine learning model and the second machine learning model.

4. The method of claim 1, wherein the category is associated with one or more of:
   a network connectivity issue,
   a network bandwidth issue,
   a network signal strength issue, or
   a customer premises equipment issue.

5. The method of claim 1, wherein performing the one or more recovery actions comprises one or more of:
   providing a notification, associated with the category, to one or more customer devices;
   dispatching a technician to address a technical problem associated with the category; or
   dispatching an autonomous vehicle to address the technical problem associated with the category.

6. The method of claim 1, wherein performing the one or more recovery actions comprises one or more of:
   causing a new network device to be added to the telecommunications network based on the category;
   changing a configuration of the telecommunications network based on the category; or
   causing a software upgrade to be implemented in the telecommunications network based on the category.

7. The method of claim 1, wherein the first plurality of machine learning models or the second plurality of machine learning models include:
   one or more random forest models,
   one or more linear regression models, and
   one or more neural network models.

8. A device, comprising:
   one or more memories; and
   one or more processors, communicatively coupled to the one or more memories, configured to:
      receive real time telecommunications data associated with a telecommunications network;

anonymize the real time telecommunications data to remove data identifying a telecommunications network provider and customers of the telecommunications network provider, and to generate anonymized real time telecommunications data;

determine first accuracy scores for a first plurality of machine learning models and second accuracy scores for a second plurality of machine learning models;

provide the anonymized real time telecommunications data to another device that selects a first machine learning model, from the first plurality of machine learning models, based on the anonymized real time telecommunications data and the first accuracy scores, and that selects a second machine learning model, from the second plurality of machine learning models, based on the anonymized real time telecommunications data and the second accuracy scores;

receive the first machine learning model and the second machine learning model from the other device;

in a first stage, process the real time telecommunications data, with the first machine learning model, to determine a probability score indicating whether a customer technical problem telephone call will occur, wherein the one or more processors, to process the real time telecommunications data, with the first machine learning model, to determine the probability score, are configured to:
determine a propensity score indicating a propensity of a customer to complain,
determine a likelihood score indicating a likelihood that the customer is affected by a technical problem, and
determine the probability score based on the propensity score and the likelihood score;

in a separate second stage performed subsequent to completion of the first stage, process, based on the probability score satisfying a threshold, the real time telecommunications data, with the second machine learning model, to determine a category associated with the customer technical problem telephone call; and perform one or more recovery actions based on the category.

9. The device of claim 8, wherein the real time telecommunications data includes one or more of:
real time customer premises equipment data associated with the telecommunications network,
real time access layer data associated with an access layer of the telecommunications network,
real time call center log data associated with the telecommunications network, or
real time backend data associated with the telecommunications network.

10. The device of claim 8, wherein, based on the probability score failing to satisfy the threshold, the one or more processors are further configured to:
prevent the processing of the real time telecommunications data with the second machine learning model.

11. The device of claim 8, wherein the real time telecommunications data includes one or more of:
real time customer premise equipment data associated with the telecommunications network,
real time network device inventory data associated with the telecommunications network, or
real time customer calls data associated with the telecommunications network.

12. The device of claim 8, wherein the one or more processors are further configured to:
train the first plurality of machine learning models with historical telecommunications data to generate a first plurality of trained machine learning models; and
provide the first plurality of trained machine learning models to the other device.

13. The device of claim 8, wherein the one or more processors are configured, when receiving the second machine learning model selected from the second plurality of machine learning models based on the real time telecommunications data, to:
train the second plurality of machine learning models with historical telecommunications data to generate a second plurality of trained machine learning models; and
provide the second plurality of trained machine learning models to the other device.

14. The device of claim 8, wherein the real time telecommunications data includes one or more of:
information identifying a response action performed by a monitoring device, or
information identifying a result associated with performing the response action.

15. A non-transitory computer-readable medium storing a set of instructions, the set of instructions comprising:
one or more instructions that, when executed by one or more processors of a device, cause the device to:
receive real time telecommunications data associated with a telecommunications network;
anonymize the real time telecommunications data to remove data identifying a telecommunications network provider and customers of the telecommunications network provider, and to generate anonymized real time telecommunications data;
determine first accuracy scores for a first plurality of machine learning models and second accuracy scores for a second plurality of machine learning models;
select a first machine learning model from the first plurality of machine learning models based on the anonymized real time telecommunications data and the first accuracy scores;
select a second machine learning model from the second plurality of machine learning models based on the anonymized real time telecommunications data and the second accuracy scores;
in a first stage, process the real time telecommunications data, with the first machine learning model, to determine a probability score indicating whether a customer technical problem telephone call will occur,
wherein the one or more instructions, that cause the one or more processors to process the real time telecommunications data, with the first machine learning model, to determine the probability score, cause the one or more processors to:
determine a propensity score indicating a propensity of a customer to complain,
determine a likelihood score indicating a likelihood that the customer is affected by a technical problem, and
determine the probability score based on the propensity score and the likelihood score;
determine whether the probability score satisfies a threshold;
in a separate second stage performed subsequent to completion of the first stage, selectively process, based on whether the probability score satisfies the threshold, the real time telecommunications data, with the second machine learning model, to determine a category associated with the customer technical problem telephone call, wherein the real time telecommunications data is processed with the second machine learning model, to determine the category, based the probability score satisfying the threshold, and wherein the real time telecommunications data is not processed with the second machine learning model based on the probability score failing to satisfy the threshold; and perform one or more recovery actions based on the category.

16. The non-transitory computer-readable medium of claim 15, wherein the one or more instructions further cause the device to:

provide the anonymized real time telecommunications data to another device that selects the first machine learning model and the second machine learning model.

17. The non-transitory computer-readable medium of claim 15, wherein the one or more instructions, that cause the device to perform the one or more recovery actions, cause the device to one or more of:

provide a notification, associated with the category, to one or more customer devices;

dispatch a technician to address a technical problem associated with the category;

dispatch an autonomous vehicle to address the technical problem associated with the category;

cause a new network device to be added to the telecommunications network based on the category;

change a configuration of the telecommunications network based on the category; or cause a software upgrade to be implemented in the telecommunications network based on the category.

18. The non-transitory computer-readable medium of claim 15, wherein the real time telecommunications data includes one or more of:

real time customer premises equipment data associated with the telecommunications network, real time access layer data associated with an access layer of the telecommunications network, real time call center log data associated with the telecommunications network, or real time backend data associated with the telecommunications network.

19. The non-transitory computer-readable medium of claim 15, wherein the probability score satisfying the threshold reduces determination of an incorrect category by the second machine learning model.

20. The non-transitory computer-readable medium of claim 15, wherein the category is associated with one or more of:

line instability, line slowness,

Wi-Fi issues, or computer premises equipment (CPE) health issues.

* * * * *